April 15, 1969 SEIJI KIRIMOTO ETAL 3,439,324

BACKUP WARNING DEVICE FOR A VEHICLE

Filed June 27, 1966

INVENTORS.
SEIJI KIRIMOTO
BY TAIZO KANEKO

Kurt Kelman
AGENT

INVENTORS.
SEIJI KIRIMOTO
BY TAIZO KANEKO

Kurt Kelman
AGENT

INVENTORS.
SEIJI KIRIMOTO
BY TAIZO KANEKO

Kurt Kelman
AGENT

United States Patent Office 3,439,324
Patented Apr. 15, 1969

3,439,324
BACKUP WARNING DEVICE FOR A VEHICLE
Seiji Kirimoto, Wakayama-ken, and Taizo Kaneko, Gunma-ken, Japan, assignors to Nikko Electric Industry Co., Ltd., Tokyo, Japan
Filed June 27, 1966, Ser. No. 560,483
Claims priority, application Japan, Sept. 13, 1965, 40/74,617
Int. Cl. B60q 1/26
U.S. Cl. 340—70                                    3 Claims

ABSTRACT OF THE DISCLOSURE

An electrical warning device actuated by gear shifting linkage when placed in reverse. The device consists of a buzzer mounted in a sealed housing, the buzzer having an actuating relay and an associated condenser mounted on a support plate in the housing. The support plate is attached to the buzzer by resilient vibration dampening straps to protect the relay and condenser against damage.

---

The present invention relates to a backup device for vehicles to warn people who are behind a vehicle, by intermittent sounds (buzzing, ringing, etc.), when the vehicle is to be backed up.

An object of this invention is to provide a back up warning device for a vehicle in which are warning means is insulated from vibration and impact.

A further object of this invention is to provide a backup warning device for a vehicle in which the warning device is insulated from water, mud, gravel, etc.

Figure 1:
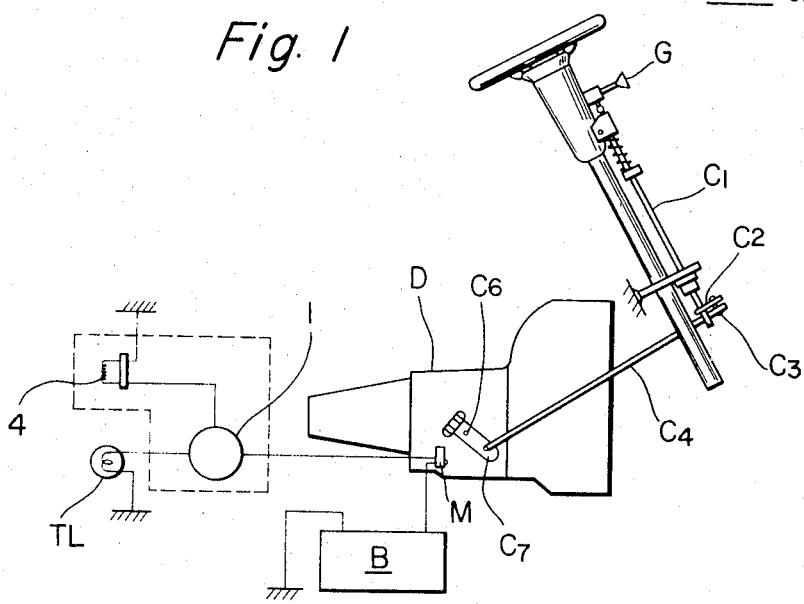
Figure 2:
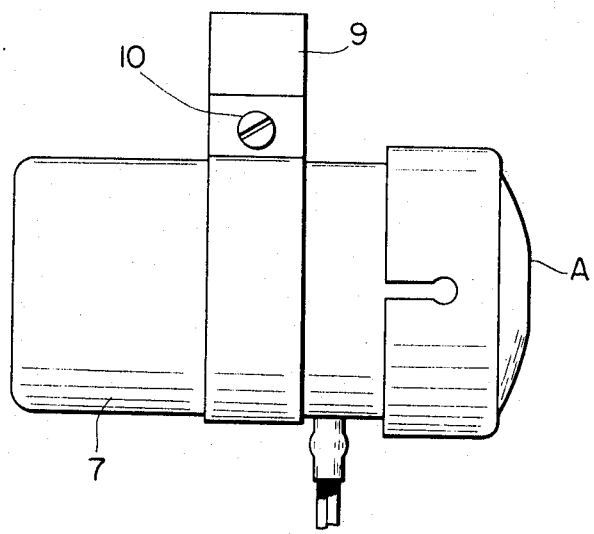
Figure 3:
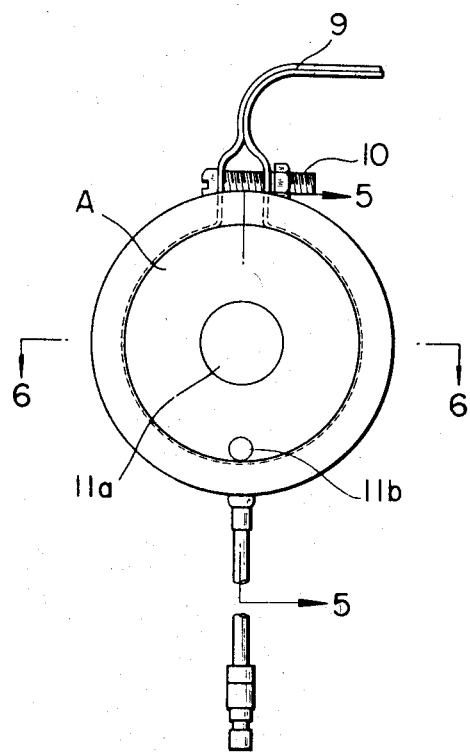
Figure 4:
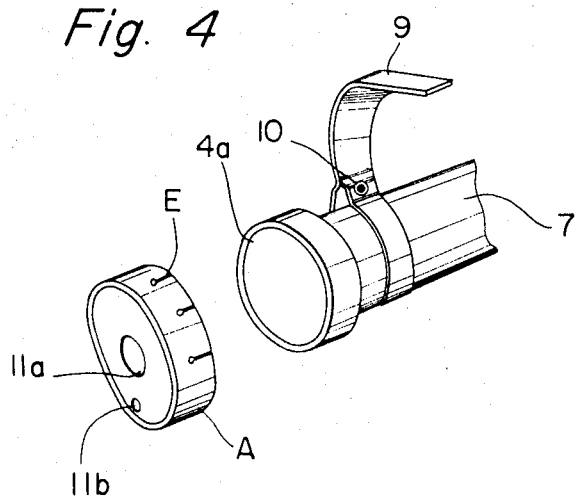

The object and advantage of subject invention will become readily apparent from the following detailed description, in which:

FIG. 1 shows an outline of the construction of a system for the operation of a warning device of subject invention. FIGS. 2, 3, 4, 5 and 6 show details of the buzzer part of the alarm, said figures showing respectively a side view, an end view, a perspective view, a vertical cross section taken along the line 5—5 of FIG. 3 and a cross section taken along line 6—6 of FIG. 3 respectively. FIG. 7 is an electric connection diagram of the buzzer part of the warning device of the present invention.

Now the present invention is explained with reference to the drawings in FIG. 1, G is a gear shift lever carried by a shaft $C_1$ which is provided at its lower end with an arm $C_2$. The latter is connected by a pin $C_3$ to a link $C_4$ which extends to a shifting lever $C_7$ on a shaft $C_6$ of a gear box D, all in accordance with conventional practice. A normally open microswitch M is secured to the gear box, the switch being engageable by and closed by the lever $C_7$ when the latter is shifted to a back-up or reverse position.

In the drawing B is a storage battery of a warning circuit, TL is a backup light, 4 is a warning buzzer and 1 is an interrupter relay such as a flasher.

Since the storage battery B is in series with the interrupter 1, an intermittent current is supplied to the backup light TL and alarm buzzer 4, and backup light TL flashes at the same time the warning buzzer 4 intermittently buzzes.

Now, referring to FIGS. 2 through 6 the buzzer 4 in said warning device is explained in detail. There is provided at one end of a housing or case 7 a protector A which protects a vibration plate 4a of the alarm buzzer from muddy water, rainwater, gravel, pebbles, etc. The protector A is provided with a hole for speaker 11a, so the sounds generated by vibration plate 4a are loud enough to attract attention.

The vibration plate or diaphragm 4a of the buzzer has approximately the same diameter as the case 7 and is mounted in a groove of a sealing sleeve 12 at the open end of case 7 wherein buzzer is encased. The buzzer sleeve 12 is made of synthetic resin or the like material for purposes of insulation and waterproofing. The sleeve closely contacts the vibration plate 4a and the inner part of case 7 is tightly closed around the sleeve. A cap 13 is mounted on buzzer sleeve 12, and protector A is mounted on cap 13. Protector A is provided at its center with the aforemention hole 11a for the speaker which passes the sounds of vibration plate 4a and also is provided in its lower portion with port 11b which drains water such as may gather between the vibration plate 4a and protector A. On the side surface of protector A, slits E are provided in order to give an elasticity. A support strap 9 provided with a clamp bolt 10 embraces the case for attaching the device to the vehicle.

Figure 5:
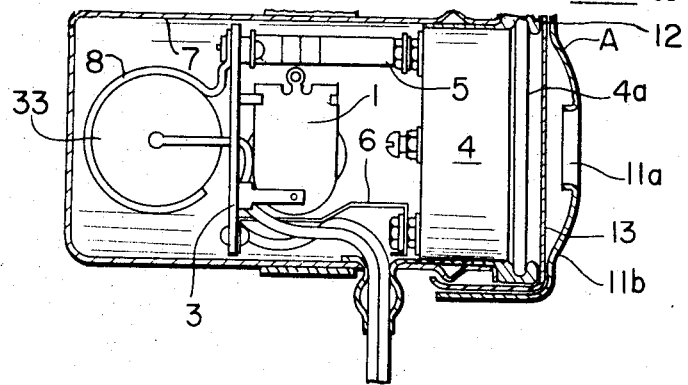
Figure 6:
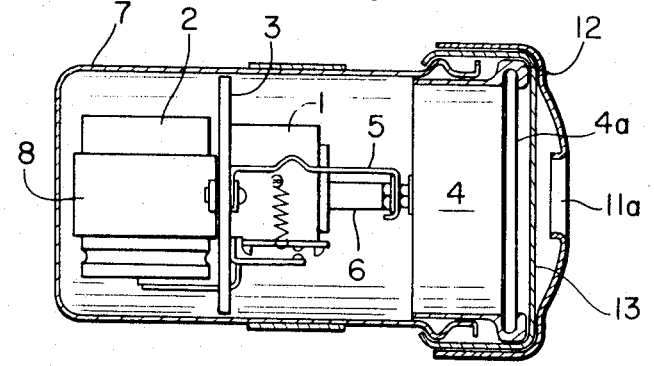
Figure 7:
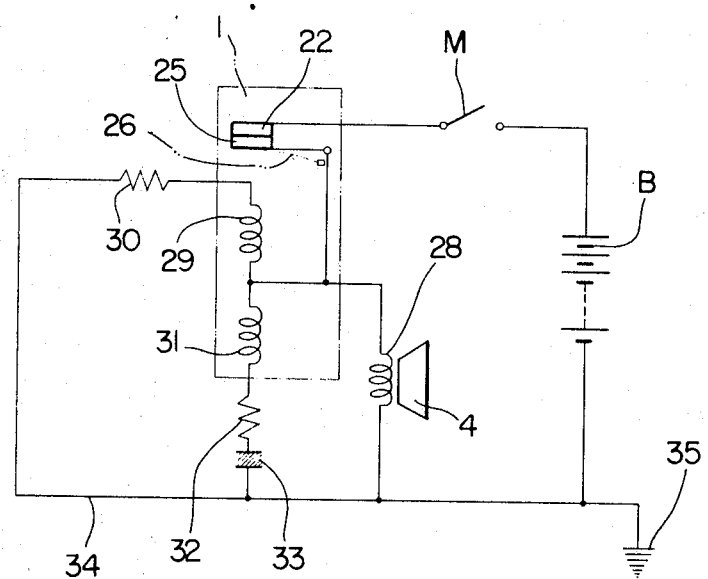

The interior construction of the buzzer is shown in FIGS. 5 and 6. The end portions of a pair of resilient straps 5 and 6 are angulated and secured to the buzzer 4 at one end, and to a support plate 3 at the other end. The plate 3 carries the aforementoned relay 1 and an electric condenser 33. The straps 5 and 6 are disposed in longitudinal planes which are at right angles to each other, as is best shown in FIG. 5.

The strap 5 is bent in a shape of V at approximately its center part as seen in FIG. 6 so as to absorb an impact in a longitudinal direction. The strap 6 as shown in FIG. 5 is laterally offset in its intermediate portion so as to absorb an impact in a longitudinal direction.

Since the straps 5 and 6 are disposed in planes at right angles to each other, one strap may absorb vibration and impact forces in one plane while the other strap is relatively rigid in that plane for proper support of the plate 3, and conversely for forces acting in another plane at right angles to the first plane.

The relay 1 and condenser 2 which are supported by the plate 3 and are relatively weak against vibration and impact, are thus safeguarded against damage by vibrations reaching the case 7 from the chassis The electric connection of the alarm device of the present invention is shown in FIG. 7. A fixed contact 22 of relay 1 is connected to the positive side of the battery B through a switch M. A movable contact 25 is biased by a spring 26 against the fixed contact 22.

An electromagnetic coil 29 of relay 1 and resistor 30 are connected to an eletcromagnetic coil 28 of buzzer 4. A junction point between electromagnetic coils 29 and 31 is connected to movable contact 25. An electromagnetic coil 31, coaxial with electromagnetic coil 29 and wound in the same direction with it, is provided. A resistor 32 and an electric condenser 33 are connected to electromagnetic coil 31. The other end of resistor 30, electric condenser 33, electromagnetic coil 28 and one side of the battery B are grounded through a connection 34 at point 35.

The operation of the present device is explained as follows: when the gear shift lever G is set at a forward position, switch M is open, the circuit of the battery B is open, buzzer 4 and realy 1 do not operate and no alarm sound is generated. When the gear shift lever G is set to a reverse position, switch M is closed by the lever C, an electric current flows from the battery B through switch M, fixed contact 22 and movable contact 25 into electromagnetic coil 28 and electromagnetic coils 29 and 31 causing buzzer 4 to be energized. The current which flows through electromagnetic coil 29 into resistor 30 of the current which flows into electromagnetic coil 29 and 31 attracts movable contact 25 so that a magnetic flux which breaks the movable contact current is generated.

Since a magnetic flux which is generated by a charging current which charges condenser 33 through electromagnetic coil 31 of resistor 32 is in a direction to erase a magnetic flux generated in electromagnetic coil 29, movable contact 25 is not attracted while condenser 33 is being charged and buzzer 4 continues its blowing.

After condenser 33 is charged completely, the current in magnetic coils 29 and 31 flows only into electromagnetic coil 29, movable contact 25 is attracted against spring 26 and is separated from fixed contact 22. The circuit of the battery B is opened, the current flowing into electromagnetic coils 28, 29 and 31 is interrupted and buzzer 4 ceases to blow.

Since the electric charge on condenser 33 is discharged through resistor 30, resistor 32, electromagnetic coils 31 and 29, movable contact 25 is attracted until condenser 33 discharges completely. The circuit of battery B is left open and the current in the movable contact does not flow, buzzer 4 maintains a state of ceasing blow. When condenser 23 discharges completely movable contact 25 again contacts with fixed contact 22 by spring 26, the circuit of the battery B is closed, an electric current flows into electromagnetic coils 28, 29 and 31, and buzzer 4 sounds again.

What is claimed is:

1. In a back up warning device for vehicles, the combination of a substantially cylindrical housing adapted to be secured to a vehicle chassis and having a closed end and an open end, a sealing sleeve provided in the open end portion of said housing, a disc-shaped buzzer mounted in said sealing sleeve, said sleeve being provided with an internal annular groove externally of said buzzer, a diaphragm mounted in said groove, a support plate disposed in said housing in axially spaced relation from said buzzer, a buzzer actuating relay and an associated condenser mounted on said plate, and vibration dampening means attaching said plate to said buzzer whereby to protect said relay and condenser against damage by vibration affecting the housing, said dampening means comprising a pair of resilient straps extending longitudinally between and having their opposite ends secured to said plate and to said buzzer respectively, said straps being disposed in longitudinal planes which are at right angles to each other, whereby either strap may dampen vibrations in one plane while the other strap is relatively rigid in that plane for adequate support of said plate.

2. The device as defined in claim 1 wherein said straps are provided with angulated intermediate portions which are offset laterally from the respective planes of the straps.

3. The device as defined in claim 1 together with a cap and a protective cover mounted on the open end portion of said housing and on said sealing sleeve externally of said diaphragm.

References Cited

UNITED STATES PATENTS 1,469,337  10/1923  Sanborn.
2,829,213   4/1958  Brett _____ 340—70 XR ALVIN H. WARING, *Primary Examiner.*

U.S. Cl. X.R.

116—36; 200—61.88; 340—52